United States Patent [19]

Shono et al.

[11] 4,279,489

[45] Jul. 21, 1981

[54] INTERCHANGEABLE EYE PIECE-HOUSING

[75] Inventors: Tetsuji Shono; Kazuo Goto, both of Kawagoe; Michiro Ohishi, Tokyo, all of Japan

[73] Assignee: Asahi Kogaku Kogyo Kabushiki Kaisha, Tokyo, Japan

[21] Appl. No.: 34,037

[22] Filed: Apr. 27, 1979

[30] Foreign Application Priority Data

Apr. 28, 1978 [JP]  Japan ................................. 53-52069

[51] Int. Cl.³ ..................... G03B 13/08; G03B 19/12
[52] U.S. Cl. .................................. 354/155; 354/223; 354/219
[58] Field of Search ........... 354/155, 223, 219, 219 IF

[56] References Cited

U.S. PATENT DOCUMENTS 1,267,596  5/1918  Schleinzer .............................. 350/77
4,131,354  12/1978  Hagiwara ........................ 354/219 IF

FOREIGN PATENT DOCUMENTS 2559601  9/1977  Fed. Rep. of Germany ........... 354/155
2727168  12/1977  Fed. Rep. of Germany ........... 354/219

*Primary Examiner*—J. V. Truhe
*Assistant Examiner*—Shelley Wade
*Attorney, Agent, or Firm*—Sughrue, Mion, Zinn, Macpeak and Seas

[57] ABSTRACT

A single lens reflex camera having a Keplerian telescope type eye level finder optical system and the display of data in a viewfinder, the data display is provided on the second focus surface of the optical system or in the vicinity thereof. A interchangeable eye piece housing uses a mount device having a camera side mount and an eye piece side mount provided between the second focus surface and an eye level eye piece of the optical system. An eye level eye piece housing and a waist level eye piece housing are interchangeably mounted on the camera side mount. The eye level eye piece housing comprises an eye level eye piece and an eye piece side mount. A waist level eye piece housing comprises a waist level eye piece, a waist level prism or two mirrors having two reflection surfaces perpendicular to a plane including an exit optical axis extended from the camera side mount and the optical axis of the waist level eye piece to change the direction of the exit optical axis so that the exit optical axis is extended into the waist level eye piece.

9 Claims, 4 Drawing Figures

INTERCHANGEABLE EYE PIECE-HOUSING

BACKGROUND OF THE INVENTION

This invention relates to an improvement of a Keplerian telescope type eye level finder in a single lens reflex camera (hereinafter referred to merely as "a camera" when applicable as disclosed in the specification of the prior Japanese Patent Application No. 21717/1977 filed by the present applicant.

In general, the finder of a camera is constructed so that an electing image is observed at eye level. However, in low angle, closeup and duplicating shots, a so-called waist level finder is more convenient. Accordingly, a variety of methods of alternately using the eye level finder and the waist level finder for one camera have been proposed in this art. For instance, for the most ordinary cameras comprising a penta-prism and an eye piece, a method is employed in which the penta-prism is modified to be removable from the camera, and the photographer looks directly into the focussing screen from above. Alternatively, a method is employed in which an angle finder comprising a dach prism, a relay lens and an eye piece is provided behind the above-described eye piece.

However, the former method is disadvantageous in that the right and left of the image to be observed are opposite to those of the object. That is, a reverse image is formed. The latter method is also disadvantageous in that the angle finder is expensive.

The Keplerian telescope type eye level finder has been also modified in a manner such that, as in the above-described penta-prism, the mirror or the prism above the focussing screen is modified to be removable (or foldable), and the photographer can directly look at the focussing screen. (cf. Japanese Patent Application Publication No. 15987/1976). Alternatively, it is modified in such a manner that an angle finder similar to that described above is provided behind the eye piece. Accordingly, the Keplerian telescope type eye level finder suffers from the same difficulties as those described above.

SUMMARY OF THE INVENTION

Accordingly, an object of this invention is to improve a camera having a Keplerian telescope type eye level finder optical system and a means for displaying data in a finder, which is provided on the second focus surface of the optical system, so that the camera can be used most effectively at waist level.

This and other objects are accomplished by means of a Keplerian telescope type eye level finder optical system and the display of data in a view finder. The data display is provided on the second focus surface of the optical system or in the vicinity thereof. An interchangeable eye piece housing uses a mount device having a camera side mount and an eye piece side mount provided between the second focus surface and an eye level eye piece of the optical system. An eye level eye piece housing and a waist level eye piece housing are interchangeably mounted on the camera side mount. The eye level eye piece housing comprises an eye level eye piece and an eye piece side mount. A waist level eye piece housing comprises a waist level eye piece, a waist level prism or two mirrors having two reflection surfaces perpendicular to a plane including an exit optical axis extended from the camera side mount and the optical axis of the waist level eye piece to change the direction of the exit optical axis so that the exit optical axis is extended into the waist level eye piece.

This invention will be described with reference to the accompanying drawings.

DESCRIPTION OF THE PREFERRED EMBODIMENTS

Figure 1:
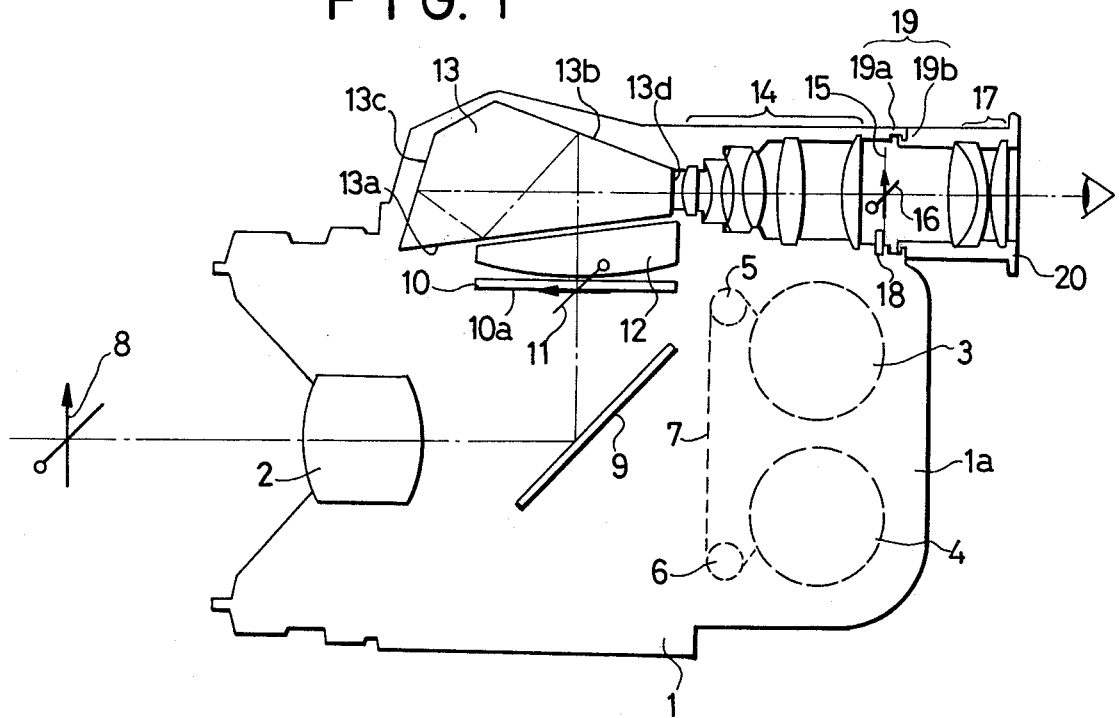
FIG. 1 is a sectional side view of a camera having a Keplerian telescope type eye level finder optical system.

FIG. 1 is a side view of a camera having a Keplerian telescope type eye level finder optical system with a prism having three reflection surfaces. In FIG. 1, a Brownie film type or a 70 mm film can be loaded in a camera 1, and a photographing lens 2 is mounted on a photographing lens loading and unloading mount (not shown). A Brownie type film 7 is loaded in the form of a character ($\Omega$) by spools 3 and 4 and rollers 5 and 6 behind the picture in the camera 1. This film loading method is similar to that disclosed by Japanese Patent Application No. 22315/1978 filed by the present applicant.

The image of an object 8 is passed through the photographing lens 2 and is reflected by a swing-up mirror 9. As a result an inverted image 11 is formed on the focus surface (first focus surface) 10a of a focusing screen 10. The inverted image 11 enters a prism 13 through a condenser lens 12 and an incident surface 13a and is reflected by a first reflection surface 13b. The image thus reflected is totally reflected by the incident surface 13a. As a result, the image leaves the prism 13 passing through an exit surface 13d. Then, the image passes through a relay lens 14 and is formed as an electing image 16 on a second focus surface 15. This image 16 is observed at the eye level with an eye level eye piece 17. The finder optical system shown in FIG. 1 is similar to that in FIG. 9 of the aforementioned Japanese Patent Application No. 21717/1977.

The finder optical system extending from the swing-up mirror 9 to the relay lens 14 is fixedly secured to the camera 1 so that it may not be removed from the camera 1.

Means 18 such as light emitting diodes for displaying aperture data, shutter data, warnings etc. are provided on the second focus surface 15 in the camera 1. A mount device 19 behind the display means 18 is provided. The mount device 19 is a conventional bayonet mount comprising a mount 19a fixedly secured to the camera 1 (hereinafter referred to "a camera side mount 19a") and a mount 9b fixedly secured to an eye level eye piece housing 20 (hereinafter referred to as "an eye piece side mount 19b"). Accordingly, the eye level eye piece housing 20 has the eye piece side mount 19b and the eye level eye piece 17.

Figure 2:
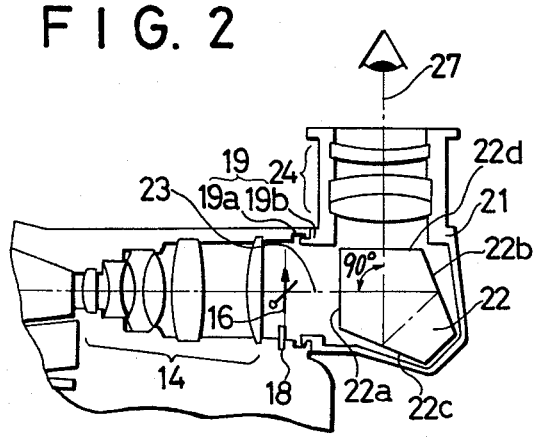
FIG. 2 is a sectional side view of a waist level finder into which the photographer looks from directly above.
Figure 3:
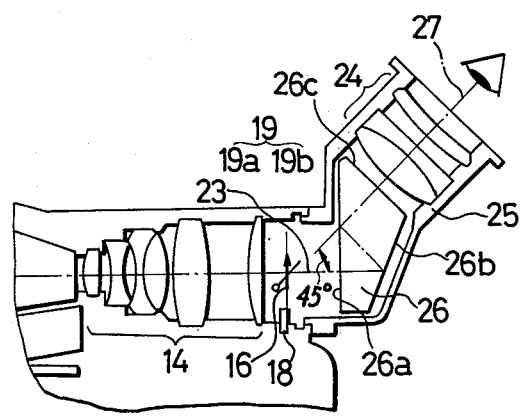
FIG. 3 is a sectional side view of a waist level finder into which the photographer looks from obliquely above.
Figure 4:
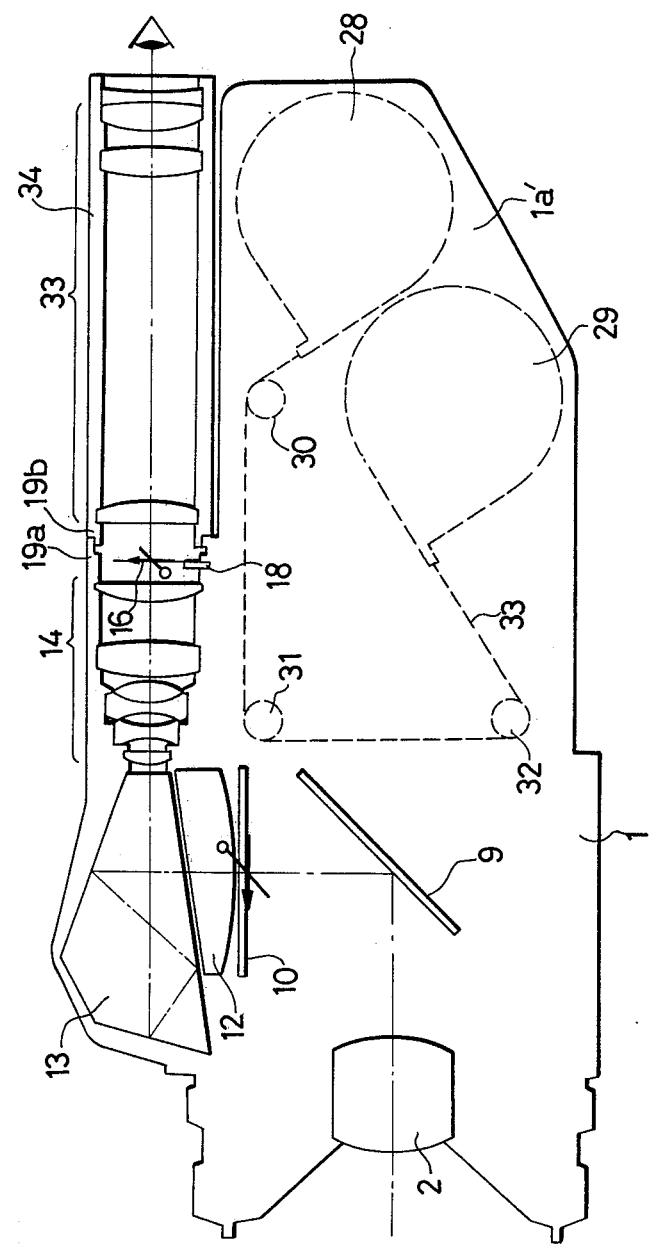
FIG. 4 is a sectional side view of an eye level extension type eye piece mounted on a camera in which a 70 mm film is loaded.

If the eye piece housing 20 is removed from the camera 1 by means of the mount device 19, then a waist level eye piece housing as shown in FIGS. 2 or 3, or an eye level extension type eye piece housing as shown in FIG. 4 can be mounted to the camera.

FIG. 2 is a sectional view showing the eye level eye piece housing mounted on the camera, through which the photographer observes the image from directly above. In FIG. 2, the eye piece side mount 19b of a waist level eye piece housing 21 is secured to the camera side mount 19a. The image 16 enters a waist level prism 22 fixedly provided in the eye piece housing 21 through an incident surface 22a. The image 16 thus entered is reflected by a first reflection surface 22b and a second reflection surface 22c in succession which are perpendicular to the surface of the drawing. As a result, the image is advanced forming 90 degrees with the optical axis 23 extending from the mount 19, thus leaving the prism 22 through an exit surface 22d. Accordingly, the image 16 is observed as an electing image through a waist level eye piece 24 in the eye piece housing 21.

FIG. 3 is a sectional view showing the waist level eye piece housing mounted on the camera, through which the photographer observes the image from obliquely above. In FIG. 3, the eye piece side mount 19b of the waist level eye piece housing 25 is secured to the camera side mount 19a. The image 16 enters a waist level prism 26 fixedly provided in the eye piece housing 25 through an incident surface 26a which is perpendicular to the surface of the drawing. The image 16 thus entering is reflected by a first reflection surface 26b which is also perpendicular to the surface of the drawing. It is then totally reflected by the incident surface 26a. As a result, the image 16 is advanced forming 45 degrees with the aforementioned optical axis 23, thus leaving the prism 26 through an exit surface 26c. Therefore, the image 16 is observed as an electing image through the waist level eye piece 24 in the eye piece housing 25.

The function of the waist level prism 22 (or 26) in FIG. 2 (or 3) is to change the direction of the exit optical axis 23 by 90 degrees (or 45 degrees) and to transmit the electing image 16 to the waist level eye piece 24 as it is. Therefore, theoretically, the waist level prism has two reflection surfaces (more precisely, an even number of reflection surfaces, and the reflection surfaces must be perpendicular to a plane including the exit optical axis 23 and the optical axis 27 of the waist level eye piece (corresponding to the surface of the drawing). This may be applied to the case also where mirrors are used instead of the waist level prism 22 or 26. The above-described cross angle 45 degrees or 90 degrees can be readily changed by changing the angles of the reflection surfaces.

FIG. 4 is an explanatory diagram showing the eye level extension type eye piece housing mounted on a camera in which a 70 mm film is loaded instead of a Brownie film. In FIG. 4, a photographing lens 2, a swing-up mirror 9, a focussing screen 10, a condenser lens 12, a prism 13, a relay lens 14, a means 18 for displaying various data in the finder, and a camera side mount 19a are identical to those elements shown in FIG. 1. However, as is apparent from comparison between FIGS. 1 and 4, instead of the spools 3 and 4, the rollers 5 and 6 and the Brownie film 7 provided in the rear part 1a of the camera in FIG. 1, 70 mm magazines 28 and 29 and rollers 30, 31 and 32 are provided in the rear part 1a' of the camera to load a 70 mm film in the form of a character (Ω) therein. This film loading method is similar to that shown in FIG. 2 of the aforementioned Japanese Patent Application No. 22315/1978.

As is clear from comparison between FIGS. 1 and 4, when the 70 mm film is loaded in the form of a character (Ω) behind the picture in the camera, the image cannot be observed without increasing the length of the finder optical system. Accordingly, it is necessary to replace the eye piece with an eye level extension type eye piece 33.

An eye level extension type eye piece housing 33 has the eye piece side mount 19b. Instead of the waist level eye piece housing shown in FIGS. 1, 2 or 3, this extension type eye piece housing 33 can be mounted to the camera side mount 19a. It is obvious that the eye level observation shown in FIG. 4 can be changed to the waist level observation by mounting the waist level eye piece housing 21 or 25 shown in FIGS. 2 or 3.

If it is assumed that in FIG. 1, the mount device 19 is not provided, it is necessary to realize a waist level finder with the eye level eye piece 17 combined with the other optical systems as one unit. Then, the angle finder must be provided behind the eye level eye piece 17. When compared with the waist level finders shown in FIGS. 2 and 3, a relay lens is additionally provided in the angle finder. Accordingly, the characteristics of the finder image are lowered, and the camera becomes necessarily bulky in photographing at the waist level. Furthermore, the cost of the angle finder itself is increased at least as much as the cost of the relay lens.

If it is assumed that the mount device 19 is positioned between the second focus surface 15 and the relay lens 14 in FIG. 1, then the means 18 for displaying data in the finder is integral with the eye level eye piece housing 20. Therefore it is necessary to additionally provide a connector for the camera. Accordingly, this method is inferior to the method according to the invention in which the amount device is provided between the second focus surface 15 and the eye level eye piece 17.

If it is assumed that in FIG. 1 the mount device 19 is provided between the prism 13 and the relay lens, then the relay lens 14, the means 18 for displaying data in the finder, and the eye level eye piece 17 form one unit. This unit can be interchanged with a unit formed by the relay lens 14, the means 18, the waist level prism 22 (or 26) and the waist level eye piece 24 in FIG. 2 (or 3), so that the camera is operated at the waist level. In this case, each unit has the relay lens 14 and the means 18 for displaying data in the finder. Accordingly, the mount device 19 is unnecessary.

It is assumed that in FIG. 1 the mount device 19 is not provided, and the prism 13 or the assembly of the prism 13 and the condenser lens 12 can be removed from the camera 1, then, if the eye piece is directly provided above the focussing screen 10, a conservation waist level finder can be obtained. In this case, the right and left of the image 11 are opposite to those of the object which is undoubtedly inconvenient for the operation of the camera. In addition, the means 18 for displaying data in the finder can not work and accordingly the means 18 must be positioned around the focusing screen 10. In this case, the right and left of the image of the means 18 are opposite to those of the means 18 at the eye level or the waist level. Furthermore, the position of the TTL light metering element is greatly limited. More specifically, when the camera is operated at the waist level, light metering cannot be achieved without positioning the element in front of the prism 13.

If, in FIG. 1, the finder optical system extending from the condenser lens 13 or the prism 13 to the eye level eye piece lens 17 is formed as one unit so that the unit can be removed from the camera, then an arrangement equivalent to that of the invention can be theoretically obtained by providing the mount device 19 at the position indicated in FIG. 1. However, in the case where the unit is removed from the camera 1 so that the eye piece is provided directly above the focussing screen 10 to, for example, operate the camera at the waist level, the above-described difficulties are encountered. That is, the right and left of the image is opposite to those of the object, the position of the means for displaying data in the finder must be changed, and the position of the TTL light metering element is limited. Hence, this method is not practical.

The invention has been described with reference to the case where the focussing screen 10 is fixedly secured to the camera 1. However, the arrangement according to the invention is not affected even if the focussing screen 10 is modified to be detachably mounted in the camera. Naturally, in this case, the method of mounting the focussing screen 10 is changed.

The following changes or modifications can be readily achieved without departing from the invention:

(1) In FIGS. 1 through 4, the eye piece can be made movable along the optical axis for eyesight adjustment.

(2) In FIGS. 2 and 3, the waist level eye piece 21 or 25 can be modified to be turnable around the exit optical axis 23 so that the photographer can look into the finder from both sides of the camera.

(3) Instead of the bayonet type coupling method, other coupling methods such as for instance a thread type coupling method are employed for the mount device 19.

(4) Instead of the light emission diodes, the pointer of a meter or a member operated according to the mechanical movement of the camera may be used as the means 18 for displaying data in the finder.

(5) In FIGS. 2 or 3, another mount device is provided between the waist level prism 22 or 26 and the waist level eye piece 24, and the waist level eye piece 24 is modified to be detachably mounted. Hence, the eye level eye piece 17 in FIG. 1 and the waist level eye piece 24 can be commonly used for the camera.

(6) Films other than a Brownie film and a 70 mm film can be loaded in the camera.

As is apparent from the above description, according to the invention, the waist level finder providing an electing image can be obtained with the smallest number of components when compared with the conventional system of changing a Keplerian telescope type eye level finder into a waist level finder. The image of the means for displaying data in the finder, which is fixedly provided on the second focus surface, can be observed as an electing image when the camera is operated at the eye level or at the waist level. Furthermore, the eye piece is detachably mounted so that it can be interchanged with another one. Therefore, the finder can readily follow the change in configuration of the camera which is caused when, for instance, a 70 mm film is loaded.

What is claimed is:

1. In a single lens reflex camera having a first focus surface, prism means, a Keplerian telescope type eye level finder optical system having a second focus surface and means for displaying data in a view finder, said display means provided on said second focus surface of said optical system and an interchangeable eye piece housing, the improvement comprising, a mount device having a camera side mount and an eye piece side mount provided between said second focus surface and an eye piece of said optical system, and an eye level eye piece housing and a waist level eye piece housing each having an eye piece side mount interchangeably mounted on said camera side mount.

2. The camera of claim 1 wherein said eye level eye piece housing comprises: an eye level eye piece; and an eye piece side mount.

3. The camera of claim 1 wherein said waist level eye piece housing comprises; a waist level eye piece; a waist level prism or two mirrors having two reflection surfaces perpendicular to a plane including an exit optical axis extending from said camera side mount and the optical axis of said waist level eye piece to change the direction of said exit optical axis so that said exit optical axis is extended into said waist level eye piece; and an eye piece side mount.

4. The camera of claims 1, 2 or 3 wherein said display means comprises a light emission diode for display of photography data.

5. The camera of claims 1, 2 or 3 wherein said mount device comprises a bayonet type coupling between the camera side mount and the eye piece side mount.

6. The camera of claims 1, 2 or 3 further comprising means interchangeably mounting and loading different film types in said camera.

7. The camera of claims 1, 2, or 3 wherein said eye piece is movable along the optical axis for eyesight adjustment.

8. The camera of claim 3 wherein said waist level eye piece is rotatable about an exit optical axis.

9. The camera of claims 3 or 8 further comprising a second mount device disposed between said waist level prism and said waist level eye piece wherein said waist level eye piece is detachably mounted.

* * * * *